US008762963B2

(12) United States Patent
Shacham et al.

(10) Patent No.: US 8,762,963 B2
(45) Date of Patent: Jun. 24, 2014

(54) TRANSLATION OF PROGRAMMING CODE

(75) Inventors: Yotam Shacham, Palo Alto, CA (US); Guy Ben-Artzi, Palo Alto, CA (US); Alexei Alexevitch, Hertzlia (IL); Amatzia Ben-Artzi, Palo Alto, CA (US); Tal Lavian, Sunnyvale, CA (US); Alexander Glyakov, Petach Tikva (IL); Russell William McMahon, Woodside, CA (US); Yehuda Levi, Rishon Lezion (IL)

(73) Assignee: Beck Fund B.V. L.L.C., Dover, DE (US)

( * ) Notice: Subject to any disclaimer, the term of this patent is extended or adjusted under 35 U.S.C. 154(b) by 660 days.

(21) Appl. No.: 12/631,311

(22) Filed: Dec. 4, 2009

(65) Prior Publication Data
US 2010/0146492 A1 Jun. 10, 2010

Related U.S. Application Data

(60) Provisional application No. 61/200,931, filed on Dec. 4, 2008.

(51) Int. Cl.
G06F 9/44 (2006.01)

(52) U.S. Cl.
USPC ........................................................ 717/137

(58) Field of Classification Search
USPC ........................................................ 717/137
See application file for complete search history.

(56) References Cited

U.S. PATENT DOCUMENTS

| | | | | |
|---|---|---|---|---|
| 5,664,061 A | * | 9/1997 | Andreshak et al. | 704/275 |
| 5,768,564 A | * | 6/1998 | Andrews et al. | 717/137 |
| 5,937,193 A | * | 8/1999 | Evoy | 717/140 |
| 6,083,279 A | * | 7/2000 | Cuomo et al. | 717/118 |
| 6,654,875 B1 | * | 11/2003 | Hartnett et al. | 712/211 |
| 6,775,814 B1 | * | 8/2004 | Jue et al. | 716/106 |
| 7,369,984 B2 | * | 5/2008 | Fairweather | 704/8 |
| 7,921,432 B2 | * | 4/2011 | Tolgu et al. | 719/328 |
| 8,427,491 B2 | * | 4/2013 | Keslin | 345/522 |
| 8,443,348 B2 | * | 5/2013 | McGuire et al. | 717/146 |
| 2003/0145011 A1 | * | 7/2003 | Su et al. | 707/100 |
| 2004/0039970 A1 | * | 2/2004 | Barnard et al. | 714/43 |

(Continued)

FOREIGN PATENT DOCUMENTS

WO WO 2005069125 A2 * 7/2005
WO WO 2009012398 A1 * 1/2009

OTHER PUBLICATIONS

Interface (computer science)—Wikipedia, the free encyclopedia, Dec. 3, 2008.*
Programming language—Wikipedia, Dec. 6, 2003.*

*Primary Examiner* — Don Wong
*Assistant Examiner* — Daxin Wu
(74) *Attorney, Agent, or Firm* — Novak Druce Connolly Bove + Quigg LLP

(57) ABSTRACT

Embodiments of the invention may provide methods and/or systems for converting a source application to a platform-independent application. Source programming language code of the source application may be translated to target programming language code of the platform-independent application. The source programming language code may comprise Connected Limited Device Configuration (CLDC) code, and the platform-independent programming language may be independent of one or more device platforms. Further, one or more source resources associated with the source application may be converted to one or more target resources.

23 Claims, 7 Drawing Sheets

(56) References Cited

U.S. PATENT DOCUMENTS

| | | | |
|---|---|---|---|
| 2004/0237072 A1* | 11/2004 | Gelissen | 717/139 |
| 2005/0172263 A1* | 8/2005 | Hariharan et al. | 717/109 |
| 2005/0229152 A1* | 10/2005 | Connell et al. | 717/104 |
| 2006/0101430 A1* | 5/2006 | Hayashi | 717/137 |
| 2007/0067373 A1* | 3/2007 | Higgins et al. | 707/206 |
| 2008/0016170 A1* | 1/2008 | MacKelprang et al. | 709/206 |
| 2008/0028384 A1* | 1/2008 | Dorn et al. | 717/162 |
| 2008/0127170 A1* | 5/2008 | Goldman et al. | 717/174 |
| 2008/0168421 A1* | 7/2008 | Meijer et al. | 717/106 |
| 2008/0216060 A1* | 9/2008 | Vargas | 717/137 |
| 2009/0044203 A1* | 2/2009 | Acker et al. | 719/320 |
| 2009/0070338 A1* | 3/2009 | Spitzig et al. | 707/10 |
| 2009/0172371 A1* | 7/2009 | Joao et al. | 712/240 |
| 2009/0172652 A1* | 7/2009 | Simon et al. | 717/148 |
| 2009/0216344 A1* | 8/2009 | Bretin | 700/21 |
| 2010/0179996 A1* | 7/2010 | Jones et al. | 709/206 |
| 2010/0306784 A1* | 12/2010 | Cooney et al. | 719/313 |
| 2011/0145591 A1* | 6/2011 | Grzybowski | 713/189 |

* cited by examiner

TRANSLATION OF PROGRAMMING CODE

CROSS-REFERENCE TO RELATED APPLICATION

This application draws priority from U.S. Provisional Patent Application No. 61/200,931, filed on Dec. 4, 2008, and hereby incorporated by reference herein in its entirety.

FIELD OF THE INVENTION

Embodiments of the invention may generally relate to programming language code translation and more specifically to translation of Connected Limited Device Configuration (CLDC) programming language code.

BACKGROUND OF THE INVENTION

Various users across the globe communicate or perform various activities on computer and device networks. Moreover, the users interact with each other through the networks, such as the Internet. Typically, the users use devices like personal computers to interact over the Internet. The users can interact from various Internet websites or social networking sites, for example, Facebook, Myspace, Hi5, and Orkut etc. Recently, the development in mobile devices such as cell phones, smartphones and PDAs, computers, laptops and the like has enabled them to be used for performing various activities on networks such as the Internet. Moreover, the mobile devices can be used for real-time interaction with other users on the network. The interaction or communication can be in the form of chatting, playing interactive online games, browsing, shopping, music, video, banking, business and the like.

The rapid pace of innovation in technology has generated various types of devices and platforms. Moreover, the number of devices is increasing rapidly. For example, there are various operating systems available for the devices such as Windows, Linux, Macintosh, and Symbian, etc. Moreover, a large number of J2ME platforms are available for the mobile devices such as cell phones. Furthermore, the mobile devices have a wide rage of capabilities in terms of screen size, screen type, screen resolution, processor, and memory etc. The applications for these devices have to be developed based on their platforms. Therefore, each application has to be ported to other platforms. For example, in case of computer games the programming languages typically used are JAVA, C#, C++, Action Script, and the like. Therefore, an application developed in Action Script programming language may have to be ported to other programming language when not supported by a device platform. Further, new applications are being continuously developed for different device platforms.

Typically, the programming code of an application is translated manually from one programming language to another. However, manual translation requires specific and in-depth knowledge of the programming languages of the different operating systems. Moreover, manual translation is a very time consuming process. Furthermore, the programming languages are constantly developed or get modified. Moreover, the applications have to be developed on specific development platforms compatible with the programming language used for development and the operating system of a device. As a result, a completed revision of the application code may be required to make the interaction possible. Some mechanisms, such as emulation of applications, are available to support multiple devices. However, the existing mechanisms generate application program codes that are large or require heavy processing time. The problem is compounded with the continuously increasing number of device platforms and technology.

Various media applications on devices such as mobile phones are developed using the CLDC. CLDC is a specification of a framework for Java™ Micro Edition (ME). JAVA™ ME applications are targeted at devices that have limited resources. Examples of such devices include mobile phones. Generally, the configuration of devices, such as mobile phones, may vary by device type, capabilities, operating system, qualities, characteristics, electronics, communications, media capabilities and so forth. Moreover, native applications are typically pre-installed in the devices, cannot be removed, and are ready to run. Some of the applications are always running while others are started by the user via the menu. Users are able to further customize their mobile devices by loading additional applications (e.g., instant messaging, games, etc.) onto these devices.

Porting or translation of these applications to new or different devices generally requires manual porting for each specific device. However, the process of manual porting is difficult and slow. Moreover, the manual process is not efficient with the rapid development pace of new devices, platforms and capabilities.

A mechanism is therefore desirable to translate the CLDC programming language code of an application into a target programming language code based on target device platform.

SUMMARY

Various embodiments of the invention may provide a method for converting a source application to a platform-independent application. The method may comprise translating source programming language code of the source application to target programming language code of the platform-independent application, wherein the source programming language code may comprise Connected Limited Device Configuration code, and wherein the target programming language is independent of one or more device platforms. Further, the method may comprise converting one or more source resources associated with the source application to one or more target resources.

Embodiments of the invention may further provide an apparatus for converting a source application to a platform-independent application. The apparatus may comprise a code transformer configured to translate source programming language code of the source application to target programming language code of the platform-independent application, wherein the source programming language code may comprise Connected Limited Device Configuration code, and wherein the platform-independent programming language is independent of one or more device platforms; and a resource converter configured to convert one or more source resources associated with the source application to one or more target resources.

Some embodiments of the invention may further provide a system for converting a source application to a platform-independent application. The system may comprise means for translating source programming language code of the source application to target programming language code of the platform-independent application, wherein the source programming language code may comprise Connected Limited Device Configuration code, and wherein the platform-independent programming language is independent of one or more device platforms; and means for converting one or more source resources associated with the source application to one or more target resources.

Some embodiments of the invention may further provide a computer-readable medium having computer-executable instructions for performing a method for converting a source application to a platform-independent application. The method may comprise translating source programming language code of the source application to target programming language code of the platform-independent application, wherein the source programming language code may comprise Connected Limited Device Configuration code, and, wherein the platform-independent programming language is independent of one or more device platforms; and converting one or more source resources associated with the source application to one or more target resources.

BRIEF DESCRIPTION OF THE DRAWINGS

Figure 1:
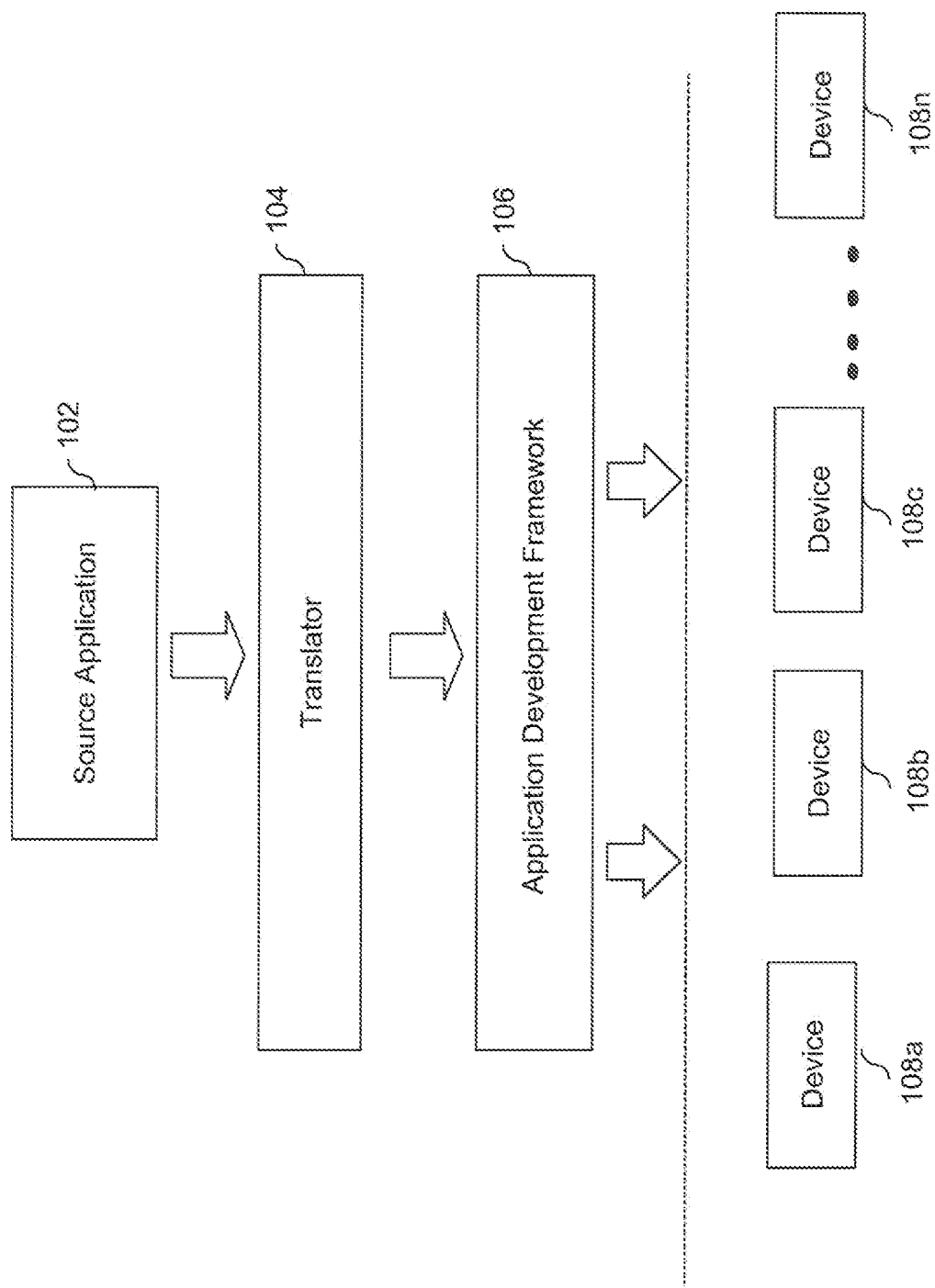
Figure 2:
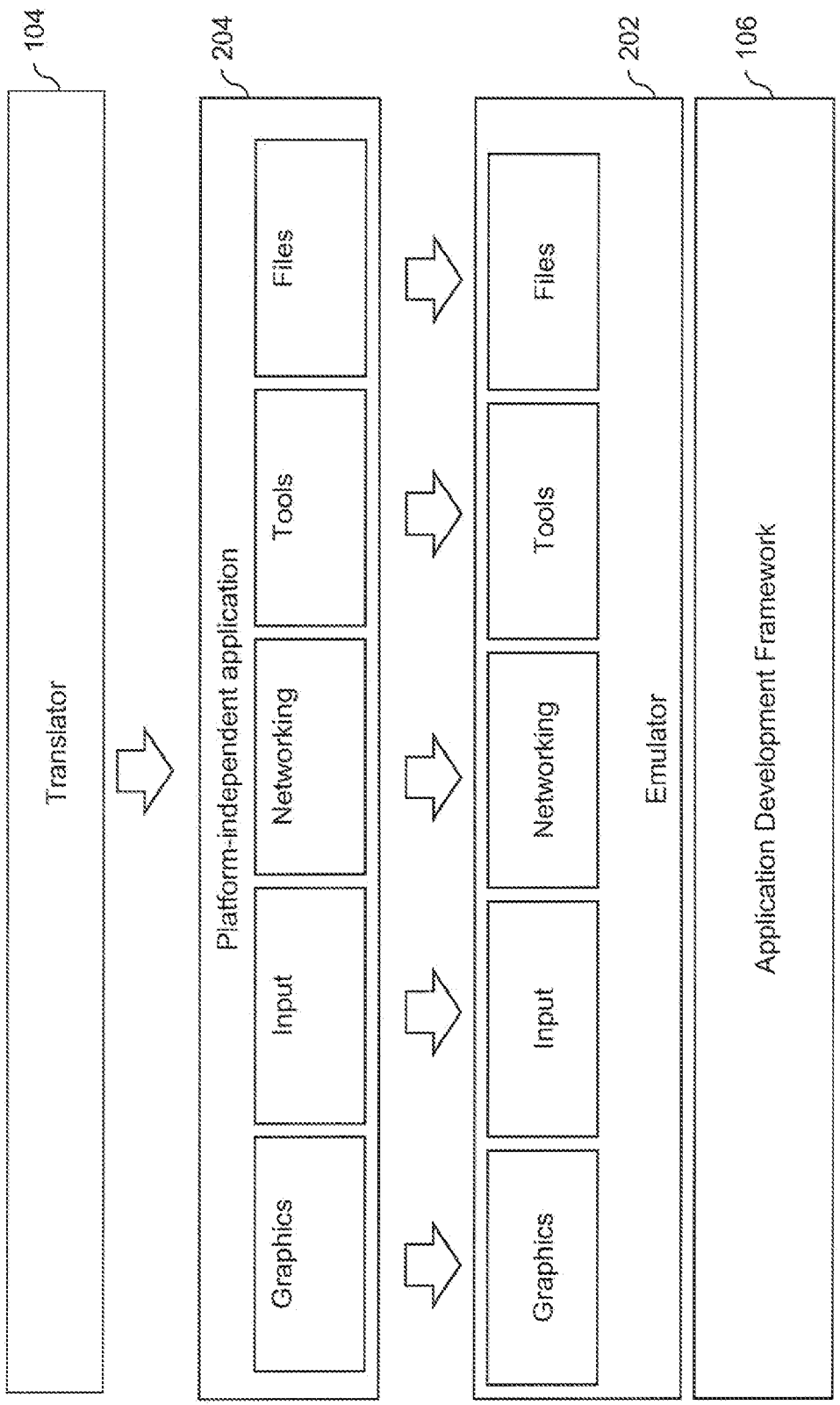
Figure 3:
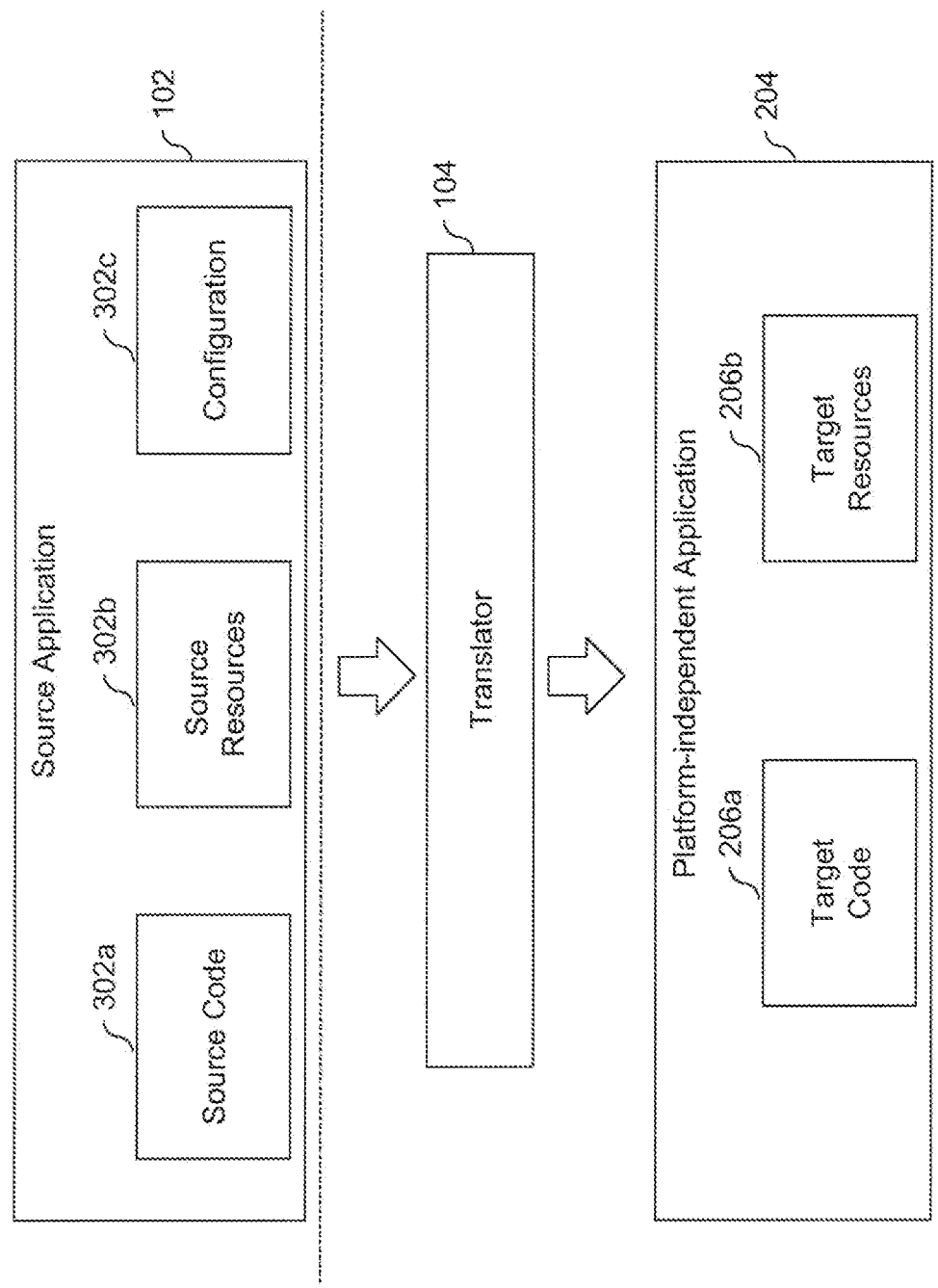
Figure 4:
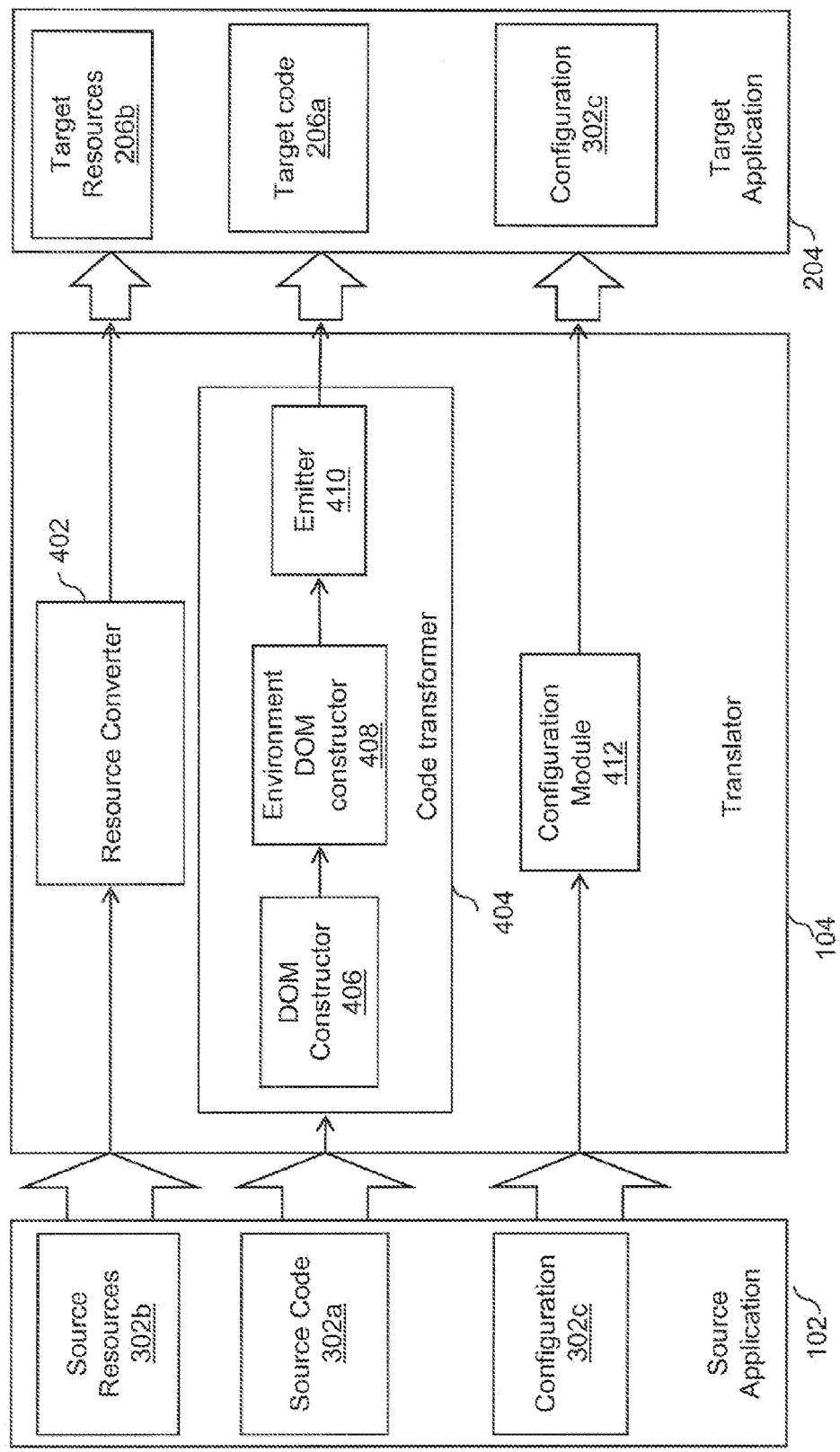
Figure 5:
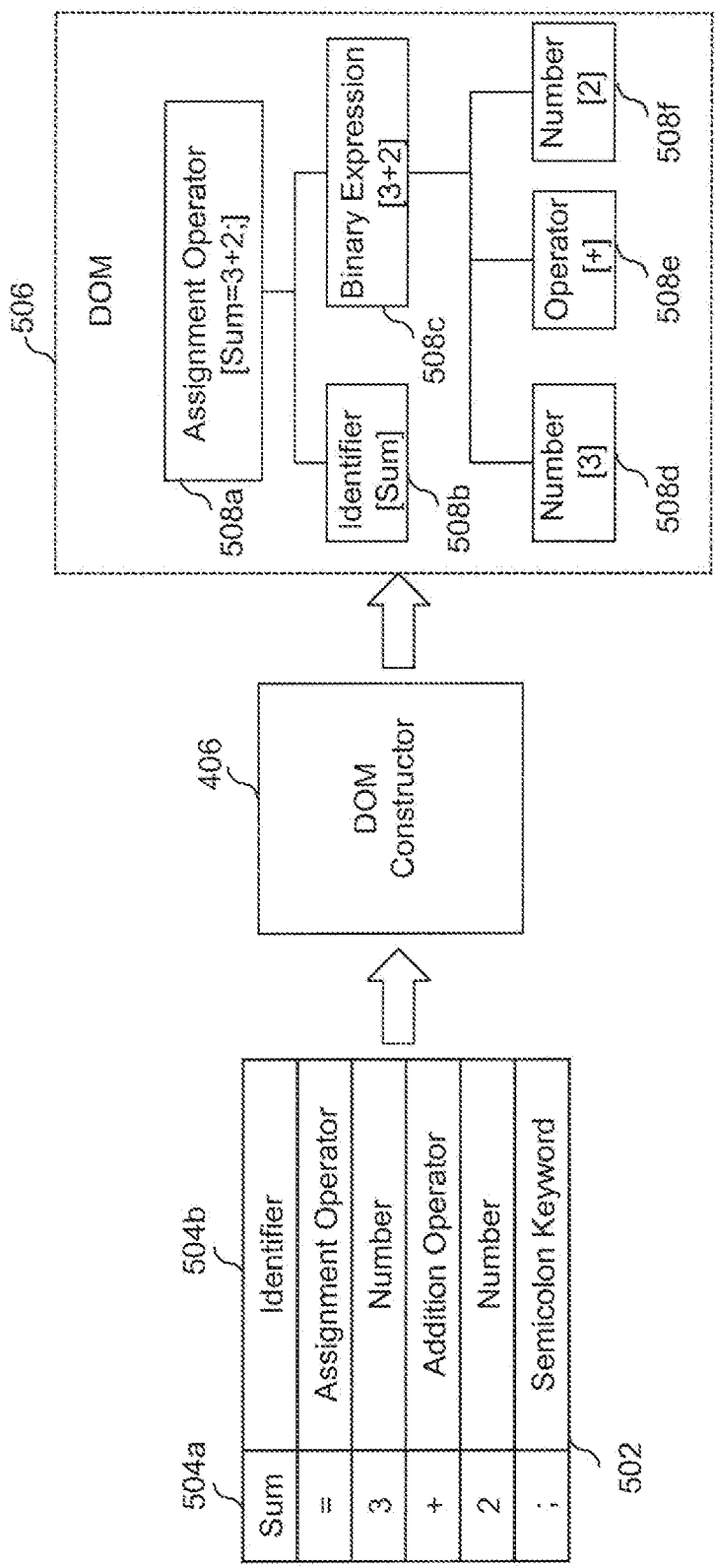
Figure 6:
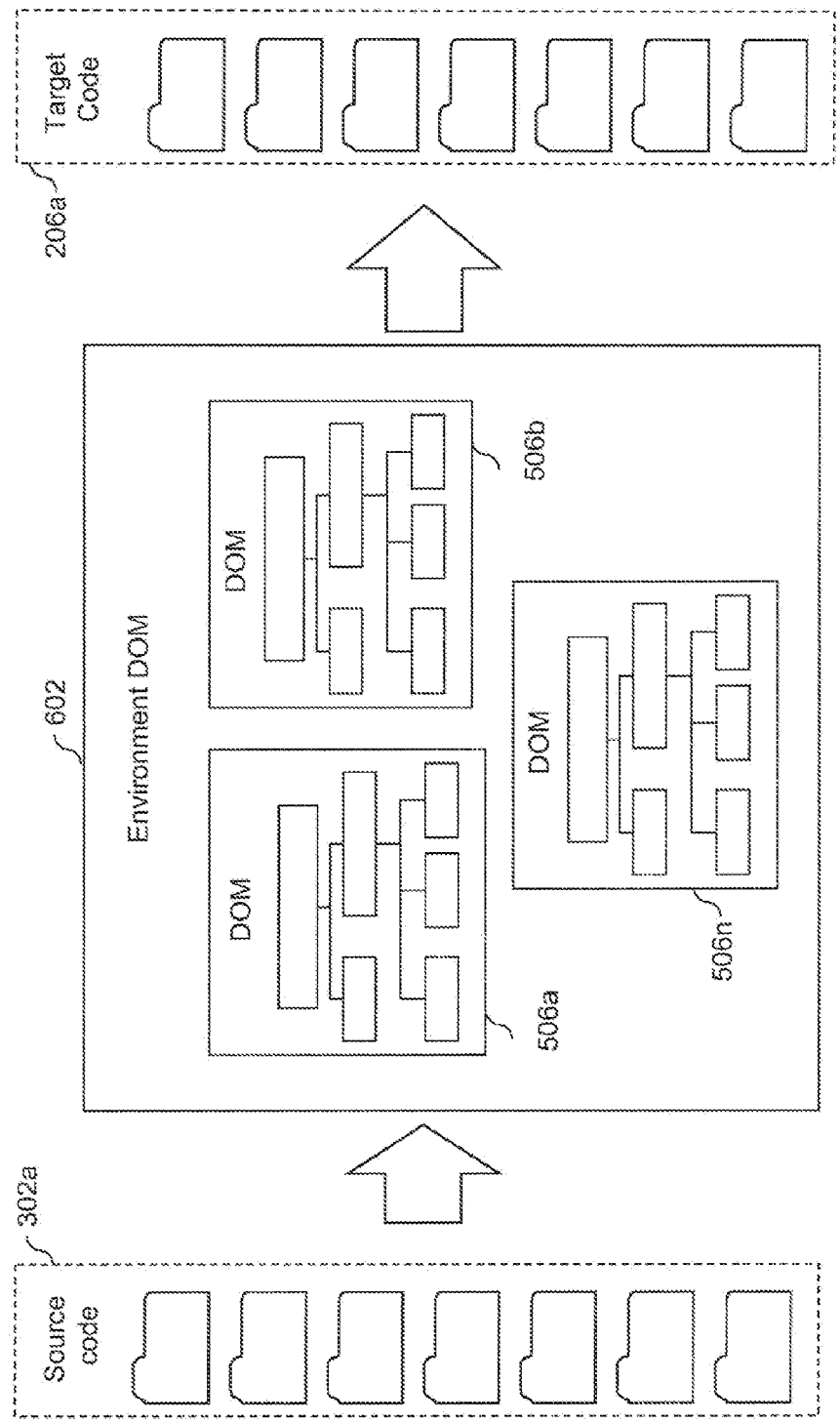
Figure 7:
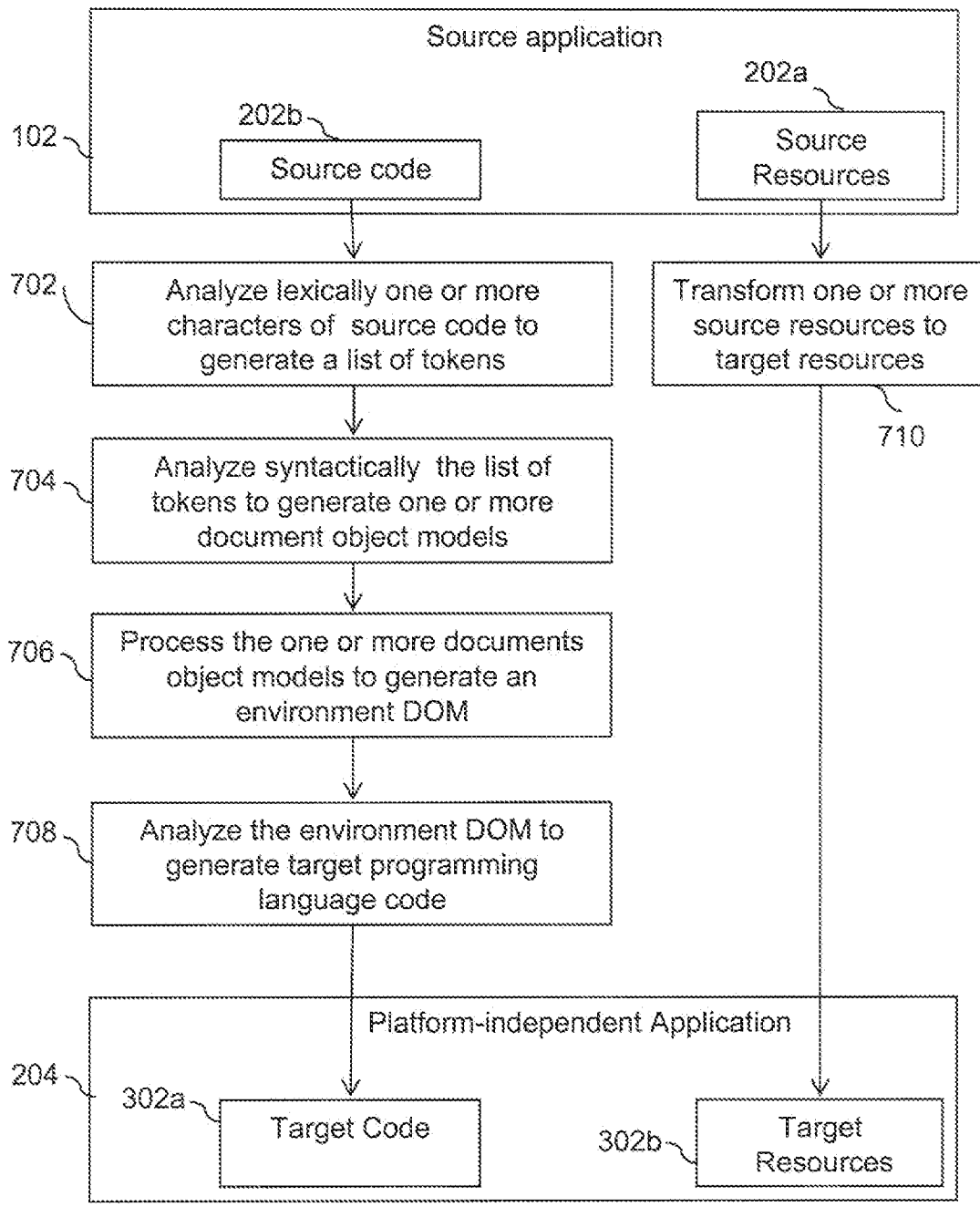

Having thus described the invention in general terms, reference will now be made to the accompanying drawings, which are not necessarily drawn to scale, and wherein:

FIG. 1 illustrates an environment where various embodiments of the invention may function;

FIG. 2 is a functional overview for extending the functionality of a platform-independent application, according to an embodiment of the invention;

FIG. 3 is a block diagram illustrating components of a source application and a platform-independent application, according to an embodiment of the invention;

FIG. 4 is the functional overview of a translator according to an embodiment of the invention;

FIG. 5 is the functional overview of a DOM constructor according to an embodiment of the invention;

FIG. 6 is the block diagram for the translation of source code to target code using environment DOM, according to an embodiment of the invention; and FIG. 7 is a flowchart illustrating the translation of CLDC source according to an embodiment of the invention.

DETAILED DESCRIPTION OF EMBODIMENTS OF THE INVENTION

Illustrative embodiments of the technology now will be described more fully hereinafter with reference to the accompanying drawings, in which some, but not all embodiments of the technology are shown. Indeed, the technology may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates an environment where various embodiments of the invention function. As shown in FIG. 1, devices 108a, 108b, 108c and 108n can be, but are not limited to, mobile devices such as a cellular phone, a PDA and a smartphone, a laptop, a personal computer and the like. Devices 108a-n are capable of executing various applications. Moreover, devices 108a-n can connect to other devices over a network, wired or wireless. Further, devices 108a-n can have different hardware and software platforms. Examples of platforms include Windows™, Linux, Macintosh, Symbian, and so forth. Different platforms may support different programming languages. Moreover, devices 108a-n can have different hardware, such as the screen size, screen resolution, audio and video functionality, processors and so forth. Therefore, the applications for each of these platforms may be developed in various programming languages compatible with the platforms of devices 108a-n. For example, C++ programming language is generally used by Windows™ platform.

As shown in FIG. 1, a source application 102 comprises programming language source code and resources for source application 102 to execute on devices 108a-n. Source application 102 is hereinafter referred to as source 102. Examples of applications include a game, a message, a calendar, an address book, a notepad, a user interface and/or other applications. Source 102 may comprise Connected Limited Device Configuration (CLDC) code. CLDC is a subset of JAVA™ programming language class libraries. The subset of class libraries provides the minimum amount of functionality required for operating a Java™ Virtual Machine (JVM) on devices 108a-n. Specifically, CLDC is a specification of a framework for Java™ Micro Edition (ME) applications that are targeted at devices with very limited resources such as, but not limited to, pagers and mobile phones. As discussed above, devices 108a-n can vary based on device types, capabilities, OS, qualities, characteristics, electronics, communications, and/or media capabilities. Therefore, porting of applications developed with CLDC code to new devices may require manual porting for each specific device, and this process may not be efficient.

Translator 104 may translate source 102 to a platform-independent application that can be easily ported to devices 108a-n based on their platforms. The functional overview of an embodiment of translator 104 is further explained in conjunction with FIGS. 3 and 4. The code and resources of the platform-independent application can then be used by application development framework 106 for rapid platform independent application development, without the need for an application developer to each know platform. Application development framework 106 may provide a framework for developing applications for devices 108 across multiple platforms. Therefore, the application developed using application development framework 106 may only need to be programmed once and can be used on various platforms of devices 108a-n. In an embodiment of the invention, application development framework 106 provides cross-translation of programming languages for various platforms. In another embodiment of the invention, application development framework 106 may enable applications to be developed based on platform specific requirement and platform independent requirements. Therefore, the complexity of the programming code and development time can be reduced. In an embodiment of the invention, application development framework 106 provides Application Programming Interface (API) for development of applications.

Application development framework 106 may also include a mapping system between a logical asset and a real asset, which may allow the cross platform use of an asset inside a generic code. Therefore, two different platforms that share the same screen family/resolutions may be able to use exactly the same assets. As a result, the application may look identical on platforms of devices 108a-n, unless an application developer wishes to customize the look or a graphical user interface for a specific platform. Therefore, a content interface may be configured to provide an application programming interface for developing an application. An application environment may be configured to handle requests from the application and one or more plug-in interfaces may be configured to provide interface between the application environment and the one or more plug-ins. Exemplary architecture and functionality of application development framework 106 is discussed in U.S. patent application Ser. No. 12/483,598, filed on Jun. 12, 2009, which is incorporated herein by reference.

FIG. 2 is a functional overview for extending functionality of a platform-independent application 204, according to an embodiment of the invention. Platform-independent application 204 is hereinafter referred to as target application 204. As shown in FIG. 2, translator 104 generates target application 204 from source 102. In an embodiment of the invention, in case certain platform functionality of target application 204 is not supported by application development framework 106, as shown in FIG. 2, an emulator 202 may be used to emulate the functionality.

Target application 204 may comprise various elements such as, but not limited to, graphics, input, networking, tools, and files. Emulator 202 may emulate elements of target application 204 converted from source 102 by translator 104. For example, the networking requirements of source 102 can be directly mapped to networking functionality of target application 204. In an embodiment of the invention, emulator 202 is a module in application development framework 106 and is implanted as a layer. Therefore, the complete functionality of source 102 can be presented on devices 108a-n with different platforms. In an embodiment of the invention, emulator 202 can be reused for each different source 102 application. Emulator 202 may act as a bridge between source 102 calls and application development framework 106 calls. Therefore, platform-independent application 204 can be used by application development framework 106 without losing the functionality, look and feel of the application.

FIG. 3 is a block diagram illustrating components of source application 102 and target application 204, according to an embodiment of the invention. As discussed with reference to FIG. 1, translator 104 converts source 102 to target application 204. Thereafter, the target application 204 can be used by application development framework 106 for compatibility and execution on devices 108a-n.

Source 102 may comprise source programming language code 302a, source resources 302b, and configuration 302c. Source programming language code 302a is hereinafter referred to as source code 302a. The programming language for source code 302a can be, for example, but is not limited to, JAVA™ programming language. Source resources 302b may comprise various resources that can be used by source 102, for example, but not limited to, images, sounds, videos, and so forth. Configuration 302c comprises the configuration data for source 102. Configuration 302c may include data that define the settings and configuration of source 102. For example, in case of an online application, configuration 302c can be connection string, refresh times and so forth.

Target application 204 may generally comprise target code 206a and target resources 206b. Target application 204 is compatible with application development framework 106, which may, in turn, translate it to platform specific source for devices 108a-n. The operational overview of an embodiment of the translation of source 102 to target application 204 is explained in detail in conjunction with FIG. 4.

FIG. 4 is the operational overview of translator 104 according to an embodiment of the invention. As shown in FIG. 4, translator 104 comprises a resource converter 402, a code transformer 404, and a configuration module 412.

According to the embodiment shown in FIG. 4, code transformer 404 converts source code 302a to target code 206a. Code transformer 404 may comprise a Document Object Model (DOM) constructor 406, an environment DOM constructor 408, and an emitter 410. Resource converter 402, as shown in FIG. 4, converts source resources 302b to target resources 206b of target application 204. In an embodiment of the invention, target resources 206b are maintained in a single lossless format. For example, images may be maintained in a PNG format. The images in resources 302b may be transformed to a single standard format, such as PNG format irrespective of the original format.

DOM constructor 406 generates a Document Object Model (DOM) for the source code 302a. A DOM is a hierarchical representation of the fundamental language construct relationships. DOM constructor 406 uses, for example, in the case in which the source code 302a comprises CLDC code, CLDC semantics for syntactic analysis of source code 302a. CLDC semantics include grammar rules for generation of DOM. In an embodiment of the invention, DOM constructor 406 functions recursively to generate the DOM. An exemplary functional overview of DOM constructor 406 is explained in conjunction with FIG. 5. In an embodiment of the invention, source code 302a includes various files of information and code, such as text. Environment DOM constructor 408 generates a collection of DOM for the files in source code 302a. The collection of DOM is hereinafter referred to as the environment DOM.

Emitter 410 may then transform the environment DOM to target code 206a. The format of target code 206a may be, for example, a text format. Target code 206a is independent of platforms of devices 108a-n. In an embodiment of the invention, emitter 410 transforms the environment DOM by using a depth first search algorithm; however, the invention is not thus limited. Target code 206a and target resources 206b are used by application development framework 106 to automatically generate native application code for devices 108a-n. Further, a configuration module 412 may provide configuration 302c to target application 204. Configuration 302c may comprise various configurations of source 102 that are used by target application 204.

FIG. 5 is an exemplary functional overview of DOM constructor 406 according to an embodiment of the invention. In an embodiment of the invention, the DOM is generated by processing source code 302a. For example, consider an expression in the source code 302a given by: 'Sum=2+3;'. A stream of characters comprising the characters 'S', 'u', 'm', '=', 2, '+', 3, and ';' is generated from source code 302a. Thereafter, the stream of characters is analyzed lexically to generate a list of tokens 502. Examples of the characters in the input stream include alphabetical characters, numerals, special characters, mathematical operators, their combinations, and so forth. In an embodiment of the invention, the characters are processed sequentially to generate list of tokens 502. DOM constructor 406 may use regular expression rules and/or CLDC semantics to generate the list of tokens 502. In an embodiment of the invention, regular expression rules and/or CLDC semantics represent patterns that may be contained in text of source code 302a. Example definitions of various types of regular expressions may be:

Identifier: is a sequence of letters 'a'-'z' or 'A'-'Z'.
Assignment operator: is the character '='
Addition operator: is the character '+'
Semicolon: is the character ';'
Number: is a sequence of characters '0'-'9'

In such an exemplary embodiment, every time a regular expression rule is completed, a new token is added to list of tokens 502. In an embodiment of the invention, DOM constructor 406 is a lexical analyzer.

In an embodiment of the invention, list of tokens 502 comprises columns of token list 504a and token type list 504b. Token list 504a comprises the tokens generated from stream of characters of source code 302a. Token type list 504b comprises the descriptions for the types of tokens. Tokens in list of tokens 502 may be categorized based on blocks of text that may be obtained from portions of the source code. Referring to list of tokens 502, the token 'Sum' in tokens 504a is defined as an 'identifier' in type list 504b. Similarly, the complete programming code of the source code 302a programming language can be processed to form a list of tokens. Subsequently, list of tokens 502 is processed by DOM constructor 406 to generate Document Object Model (DOM) 506.

DOM 506 is a grammatical data structure and defines the relationships among the tokens in list of tokens 502. DOM constructor 406 analyzes syntactically list of tokens 502 to generate DOM 506. In an embodiment of the invention, DOM 506 generates DOM 506 based on grammar rules defined for syntactic analysis. Exemplary rules may include:
Assignment Statement←Identifier=Expression;
Expression←Literal OR Binary Expression;
Binary Expression←Expression Operator Expression; and/or
Literal←Number OR Identifier.

The arrows in the above rules indicate the direction of the pattern matching reduction. Therefore, based on the above example, a statement such as 'Sum=2+3' is termed as an assignment statement. Similarly, based on the above rules, the statement '2+3' is termed as a Binary Expression.

In an embodiment of the invention, the grammar rules can be recursive. Therefore, one or more rules may be applied recursively to prepare DOM 506. As shown in FIG. 5, DOM 506 comprises nodes 508a-f. Nodes 508a-f represents a hierarchical data structure of source code 302a. For example, in FIG. 5, node 508c represents a binary expression, and nodes 508d, 508e, and 508f comprise numbers and an operator, which are subsets of the binary expression of node 508c. Similarly, various document object models can be constructed based on the files, text or codes in source code 302a. As discussed above, the collection of DOM 506 is used by environment DOM constructor 408 to generate the environment DOM. The conversion of source code 302a to environment DOM and subsequently to target code 202a is explained in conjunction with FIG. 6.

FIG. 6 is a block diagram for the translation of source code 302a to target code 206a using environment DOM, according to an embodiment of the invention. Source code 302a may comprise various input files containing programming language code. As described in FIGS. 4 and 5, the input files are processed by DOM constructor 406 and environment DOM constructor 408 to generate environment DOM 602.

Environment DOM 602 comprises multiple DOMs 506a-n corresponding to the input files. The files DOMs 506a-n may be cross-referenced to generate a more accurate final structure referred to as environment DOM 602.

Environment DOM 602 is analyzed by emitter 410 to generate output files of target code 206a. In an embodiment of the invention, the output files correspond to the DOM 608a-n. Target code 206a may comprise, for example, a text format. In an embodiment of the invention, target code 206a includes code in object oriented programming languages such as, but not limited to, C++, C#, Java, AS3, and the like.

FIG. 7 is a flowchart illustrating the translation of source 102 according to an embodiment of the invention. At step 702, one or more characters of source code 302a are analyzed lexically to generate a list of tokens. Thereafter, the list of tokens is analyzed syntactically to generate a document object model, at step 704. As discussed above, DOM constructor 406 may be used to analyze source code 302a lexically and to generate the document object model.

Subsequently, at step 706, document object models may be generated for multiple files in source code 302a and may be collected to generate an environment DOM by environment DOM constructor 408. The DOMs may be cross-referenced by environment DOM constructor 408 to generate a more accurate final structure referred to as environment DOM.

At step 708, the environment DOM may be analyzed by emitter 410 to generate target code 206a of target application 204. Resources 302b of source 102 may be transformed by resource converter 402 to generate target resources 206b of target application 204. In an embodiment of the invention, target application 204 can be used by application development framework 106 to generate platform specific applications for devices 108a-n.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing apparatus or computing devices to produce machines, such that the instructions which execute on the computers or other programmable data processing apparatus create means for implementing the functions specified in the block or blocks. Such computer program instructions may also be stored in a computer-readable medium, such as a memory, that can direct a computing device or other programmable data processing apparatus to function in a particular manner, such that the instructions stored in the computer-readable medium produce an article of manufacture including instruction means that implement the function specified in the block or blocks. Furthermore, such computer program instructions may be provided for download via a network and/or may be downloaded via a network.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method for converting a source application to a platform-independent application, the method comprising:
    translating source programming language code of the source application to target programming language code of the platform-independent application, wherein the source programming language code comprises Connected Limited Device Configuration (CLDC) code, and wherein the target programming language code is in a platform-independent programming language that is independent of one or more device platforms;
    converting one or more source resources associated with and configured to be used by the source application to one or more target resources configured for use by the platform-independent application, wherein the source resources are not included within the source programming language code of the source application and the target resources are not included within the target programming language code of the platform-independent application; and providing a configuration of the source application to the platform-independent application, wherein the configuration includes data defining settings of the source application;

wherein the translating is implemented by a first series of steps;

wherein the converting is implemented by a second series of steps; and wherein the first series of steps are different from, and independent from, the second series of steps.

2. The method of claim 1, wherein the translating the source programming language code comprises:
tokenizing one or more characters of one or more input files of the source programming language code to generate a list of tokens;
parsing the list of tokens to generate one or more document object models;
generating an environment document object model comprising the one or more document object models, wherein the one or more input files are cross-referenced within the one or more document object models of the environment document object model; and
analyzing the environment document object model to generate one or more characters of one or more output files of the target programming language code.

3. The method of claim 2, wherein the analyzing the environment document object model comprises using a depth first search algorithm.

4. The method of claim 1, wherein the one or more target resources comprise one or more platform-independent resources.

5. The method of claim 1, wherein the one or more target resources comprise one or more of an image, an audio, or a video.

6. The method of claim 1, wherein the source programming language and the platform-independent programming language are object oriented programming languages.

7. The method of claim 1, further comprising downloading computer-executable instructions that, if executed by a computing device, cause the computing device to execute said translating.

8. The method of claim 1, further comprising downloading computer-executable instructions that, if executed by a computing device, cause the computing device to execute said converting.

9. The method of claim 1, further comprising making available for downloading computer-executable instructions that, if executed by a computing device, cause the computing device to execute said translating.

10. The method of claim 1, further comprising making available for downloading computer-executable instructions that, if executed by a computing device, cause the computing device to execute said converting.

11. A system for converting a source application to a platform-independent application, the system comprising:
at least one computing device; and
at least one memory device coupled to the at least one computing device, wherein the at least one memory device contains executable instructions that, if executed on the at least one computing device, result in the implementation of operations comprising:
translating source programming language code of the source application to target programming language code of the platform-independent application, wherein the source programming language code comprises Connected Limited Device Configuration (CLDC) code, and wherein the target programming language code of the platform-independent application is in a platform-independent programming language that is independent of one or more device platforms;
converting one or more source resources associated with and configured to be used by the source application to one or more target resources configured to be used by the platform-independent application, wherein the source resources are not included within the source programming language code of the source application and the target resources are not included within the target programming language code of the platform-independent application; and
providing a configuration of the source application to the platform-independent application, wherein the configuration includes data defining settings of the source application;
wherein the translating is implemented by a first series of steps;
wherein the converting is implemented by a second series of steps; and
wherein the first series of steps for the translating are different from, and independent from, the second series of steps for the converting.

12. The system of claim 11, wherein the one or more target resources comprise one or more of an image, an audio, or a video.

13. The system of claim 11, wherein the source and the platform-independent programming languages are object oriented programming languages.

14. The system of claim 11, wherein the one or more target resources comprise one or more platform-independent resources.

15. The system of claim 11, wherein translating the source programming language code comprises:
tokenizing one or more characters of one or more input files of the source programming language code to generate a list of tokens;
parsing the list of tokens to generate one or more document object models;
generating an environment document object model comprising the one or more document object models, wherein the one or more input files are cross-referenced within the one or more document object models of the environment document object model; and
analyzing the environment document object model to generate one or more characters of one or more output files of the target programming language code.

16. The system of claim 15, wherein analyzing the environment document object model comprises using a depth first search algorithm.

17. A non-transitory computer-readable medium having computer-executable instructions that, if executed by a computing device, cause the computing device to implement operations comprising:
translating source programming language code of a source application to target programming language code of a platform-independent application, wherein the source programming language code comprises Connected Limited Device Configuration (CLDC) code, and wherein the target programming language code of the platform-independent application is in a platform-independent programming language that is independent of one or more device platforms;

converting one or more source resources associated with and configured to be used by the source application to one or more target resources configured to be used by the platform-independent application, wherein the source resources are not included within the source programming language code of the source application and the target resources are not included within, the target programming language code of the platform-independent application; and providing a configuration of the source application to the platform-independent application, wherein the configuration includes data defining settings of the source application;

wherein the translating is implemented by a first series of steps;

wherein the converting is implemented by a second series of steps; and wherein the first series of steps for the translating are different from, and independent from, the second series of steps for the converting.

18. The medium of claim 17, wherein the translating the source programming language code comprises:

tokenizing one or more characters of one or more input files of the source programming language code to generate a list of tokens;

parsing the list of tokens to generate one or more document object models;

generating an environment document object model comprising the one or more document object models, wherein the one or more input files are cross-referenced within the one or more document object models of the environment document object model; and analyzing the environment document object model to generate one or more characters of one or more output files of the target programming language code.

19. The medium of claim 18, wherein the analyzing the environment document object model comprises using a depth first search algorithm.

20. The medium of claim 17, wherein the source and the platform-independent programming languages are object oriented programming languages.

21. The method of claim 1, wherein the configuration includes one or more of a connection string or a refresh time.

22. The system of claim 11, wherein the configuration includes one or more of a connection string or a refresh time.

23. The medium of claim 17, wherein the configuration includes one or more of a connection string or a refresh time.

* * * * *